United States Patent
Lahiri et al.

(10) Patent No.: US 11,860,830 B2
(45) Date of Patent: Jan. 2, 2024

(54) COMBINED ROW AND COLUMNAR STORAGE FOR IN-MEMORY DATABASES FOR OLTP AND ANALYTICS WORKLOADS

(71) Applicant: Oracle International Corporation, Redwood Shores, CA (US)

(72) Inventors: Tirthankar Lahiri, Palo Alto, CA (US); Martin A. Reames, Minneapolis, MN (US); Kirk Edson, Fremont, CA (US); Neelam Goyal, San Mateo, CA (US); Kao Makino, San Carlos, CA (US); Anindya Patthak, Fremont, CA (US); Dina Thomas, Palo Alto, CA (US); Subhradyuti Sarkar, Fremont, CA (US); Chi-Kim Hoang, Palo Alto, CA (US); Qingchun Jiang, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 16/287,569

(22) Filed: Feb. 27, 2019

(65) Prior Publication Data
US 2019/0197026 A1     Jun. 27, 2019

Related U.S. Application Data

(63) Continuation of application No. 14/097,575, filed on Dec. 5, 2013, now Pat. No. 10,311,154.
(Continued)

(51) Int. Cl.
*G06F 16/21*      (2019.01)
*G06F 16/27*      (2019.01)

(52) U.S. Cl.
CPC .......... *G06F 16/211* (2019.01); *G06F 16/21* (2019.01); *G06F 16/278* (2019.01)

(58) Field of Classification Search
CPC ...... G06F 16/211; G06F 16/21; G06F 16/278; G06Q 50/01
(Continued)

(56) References Cited

U.S. PATENT DOCUMENTS 5,095,421 A    3/1992   Freund
5,241,675 A    8/1993   Sheth et al.
(Continued)

FOREIGN PATENT DOCUMENTS

CN      102999519 A     3/2013
CN      103177055 A     6/2013
(Continued)

OTHER PUBLICATIONS

Loaiza, U.S. Appl. No. 15/693,273, filed Aug. 31, 2017, Notice of Allowance, dated Jan. 27, 2020.
(Continued)

*Primary Examiner* — Hosain T Alam
*Assistant Examiner* — Nicholas E Allen
(74) *Attorney, Agent, or Firm* — Hickman Becker Bingham Ledesma LLP; Marcel K. Bingham

(57) ABSTRACT

Columns of a table are stored in either row-major format or column-major format in an in-memory DBMS. For a given table, one set of columns is stored in column-major format; another set of columns for a table are stored in row-major format. This way of storing columns of a table is referred to herein as dual-major format. In addition, a row in a dual-major table is updated "in-place", that is, updates are made directly to column-major columns without creating an interim row-major form of the column-major columns of the row. Users may submit database definition language ("DDL") commands that declare the row-major columns and column-major columns of a table.

18 Claims, 6 Drawing Sheets

Related U.S. Application Data

(60) Provisional application No. 61/880,884, filed on Sep. 21, 2013.

(58) Field of Classification Search
USPC .................................................. 707/609
See application file for complete search history.

(56) References Cited

U.S. PATENT DOCUMENTS

| | | | |
|---|---|---|---|
| 5,263,156 A | 11/1993 | Bowen et al. | |
| 5,287,496 A | 2/1994 | Chen et al. | |
| 5,332,265 A | 7/1994 | Orimo et al. | |
| 5,333,316 A | 7/1994 | Champagne et al. | |
| 5,355,477 A | 10/1994 | Strickland et al. | |
| 5,369,757 A | 11/1994 | Spiro et al. | |
| 5,388,196 A | 2/1995 | Pajak et al. | |
| 5,423,037 A | 6/1995 | Hvasshovd | |
| 5,454,102 A | 9/1995 | Tang et al. | |
| 5,553,279 A | 9/1996 | Goldring | |
| 5,555,404 A | 9/1996 | Torbjoslashedrnsen et al. | |
| 5,559,991 A | 9/1996 | Kanfi | |
| 5,566,315 A | 10/1996 | Milillo et al. | |
| 5,574,906 A | 11/1996 | Morris | |
| 5,581,753 A | 12/1996 | Terry et al. | |
| 5,603,024 A | 2/1997 | Goldring | |
| 5,613,113 A | 3/1997 | Goldring | |
| 5,806,076 A | 9/1998 | Ngai et al. | |
| 5,870,758 A | 2/1999 | Bamford et al. | |
| 5,870,761 A | 2/1999 | Demers et al. | |
| 5,924,096 A | 7/1999 | Draper et al. | |
| 5,951,695 A | 9/1999 | Kolovson | |
| 5,956,731 A | 9/1999 | Bamford et al. | |
| 5,974,427 A | 10/1999 | Reiter | |
| 5,983,277 A | 11/1999 | Heile et al. | |
| 5,991,771 A | 11/1999 | Falls et al. | |
| 6,014,669 A | 1/2000 | Slaughter et al. | |
| 6,122,630 A | 9/2000 | Strickler et al. | |
| 6,192,377 B1 | 2/2001 | Ganesh et al. | |
| 6,298,319 B1 | 10/2001 | Heile et al. | |
| 6,353,835 B1 | 3/2002 | Lieuwen | |
| 6,370,622 B1 | 4/2002 | Chiou et al. | |
| 6,393,485 B1 | 5/2002 | Chao et al. | |
| 6,516,327 B1 | 2/2003 | Zondervan et al. | |
| 6,574,717 B1 | 6/2003 | Ngai et al. | |
| 6,611,898 B1 | 8/2003 | Slattery et al. | |
| 6,691,139 B2 | 2/2004 | Ganesh et al. | |
| 6,839,751 B1 | 1/2005 | Dietz et al. | |
| 7,024,656 B1 | 4/2006 | Ahad | |
| 7,031,994 B2 | 4/2006 | Lao et al. | |
| 7,076,508 B2 | 7/2006 | Brourbonnais et al. | |
| 7,222,136 B1 | 5/2007 | Brown et al. | |
| 7,287,034 B2 | 10/2007 | Wong et al. | |
| 7,290,017 B1 | 10/2007 | Wang et al. | |
| 7,464,113 B1 | 12/2008 | Girkar et al. | |
| 7,496,589 B1 | 2/2009 | Jain et al. | |
| 7,548,898 B1 | 6/2009 | Tarenskeen et al. | |
| 7,558,290 B1* | 7/2009 | Nucci .................... | H03M 7/30 370/477 |
| 7,570,451 B2 | 8/2009 | Bedillion et al. | |
| 7,627,612 B2 | 12/2009 | Ahal et al. | |
| 7,644,084 B2 | 1/2010 | Rapp | |
| 7,912,051 B1 | 3/2011 | Rowlands et al. | |
| 7,966,293 B1 | 6/2011 | Owara et al. | |
| 8,239,421 B1* | 8/2012 | Marwah ............... | H03M 7/3084 707/802 |
| 8,832,142 B2 | 9/2014 | Marwah et al. | |
| 2002/0038384 A1* | 3/2002 | Khan .................... | H04L 67/02 709/245 |
| 2002/0133508 A1 | 9/2002 | Larue et al. | |
| 2002/0165724 A1 | 11/2002 | Bartus | |
| 2003/0217236 A1 | 11/2003 | Rowlands | |
| 2004/0073754 A1 | 4/2004 | Cypher | |
| 2004/0122910 A1 | 6/2004 | Douglass et al. | |
| 2004/0193574 A1 | 9/2004 | Suzuki | |
| 2004/0199552 A1 | 10/2004 | Ward et al. | |
| 2006/0004691 A1 | 1/2006 | Sifry | |
| 2006/0010130 A1 | 1/2006 | Leff et al. | |
| 2006/0212481 A1 | 9/2006 | Stacey et al. | |
| 2007/0038689 A1 | 2/2007 | Shinkai | |
| 2007/0083505 A1 | 4/2007 | Ferrari et al. | |
| 2007/0226277 A1 | 9/2007 | Holenstein et al. | |
| 2008/0098044 A1 | 4/2008 | Todd | |
| 2008/0155303 A1 | 6/2008 | Toeroe | |
| 2008/0209009 A1 | 8/2008 | Katwala et al. | |
| 2008/0215580 A1 | 9/2008 | Altinel et al. | |
| 2008/0219575 A1* | 9/2008 | Wittenstein ............ | H04N 19/90 382/238 |
| 2008/0222111 A1 | 9/2008 | Hoang et al. | |
| 2008/0222136 A1* | 9/2008 | Yates ................... | G06F 16/2228 |
| 2008/0222159 A1 | 9/2008 | Aranha et al. | |
| 2009/0138944 A1* | 5/2009 | Rajasekaran ......... | H04L 9/0869 726/4 |
| 2009/0171679 A1 | 7/2009 | Salgado et al. | |
| 2009/0235230 A1* | 9/2009 | Lucas ...................... | G06F 8/34 717/108 |
| 2009/0240664 A1 | 9/2009 | Dinker et al. | |
| 2009/0276479 A1* | 11/2009 | Lucas ...................... | G06F 8/38 709/201 |
| 2009/0287737 A1* | 11/2009 | Hammerly ........... | G06F 16/288 |
| 2010/0036843 A1 | 2/2010 | MacNaughton et al. | |
| 2010/0042587 A1* | 2/2010 | Johnson ............... | G06F 16/221 715/243 |
| 2010/0145909 A1 | 6/2010 | Ngo | |
| 2010/0278446 A1* | 11/2010 | Ganesh ................ | G06F 16/221 382/243 |
| 2010/0306234 A1 | 12/2010 | Wang et al. | |
| 2010/0332654 A1* | 12/2010 | Bose ..................... | G06F 3/1415 709/224 |
| 2011/0029569 A1* | 2/2011 | Ganesh ................ | G06F 16/284 707/796 |
| 2011/0047330 A1* | 2/2011 | Potapov ............... | G06F 12/0246 711/114 |
| 2011/0072217 A1 | 3/2011 | Hoang et al. | |
| 2011/0087637 A1 | 4/2011 | Sundaram et al. | |
| 2012/0013758 A1* | 1/2012 | Frederiksen ............ | G06K 9/36 348/222.1 |
| 2012/0054225 A1* | 3/2012 | Marwah ............... | G06F 16/2457 707/769 |
| 2012/0054533 A1 | 3/2012 | Shi et al. | |
| 2012/0063533 A1* | 3/2012 | Fonseka ............... | H04L 25/03171 375/295 |
| 2012/0221788 A1* | 8/2012 | Raghunathan .......... | G06F 17/16 711/114 |
| 2012/0296883 A1* | 11/2012 | Ganesh ................ | G06F 3/0608 707/693 |
| 2012/0317160 A1* | 12/2012 | Yanagisawa .......... | G06F 17/16 708/607 |
| 2012/0323849 A1 | 12/2012 | Garin et al. | |
| 2013/0024433 A1* | 1/2013 | Amit ...................... | H03M 7/30 707/693 |
| 2013/0060780 A1* | 3/2013 | Lahiri .................. | G06F 16/221 707/741 |
| 2013/0132684 A1* | 5/2013 | Ostrovsky ........... | G06F 11/3471 711/147 |
| 2013/0132705 A1* | 5/2013 | Ishii .................... | H03M 13/2764 711/211 |
| 2013/0151568 A1* | 6/2013 | Ellison ................. | G06F 16/284 707/802 |
| 2013/0166534 A1* | 6/2013 | Yoon ................... | G06F 16/9535 707/714 |
| 2013/0166553 A1* | 6/2013 | Yoon ................... | G06F 16/245 707/737 |
| 2013/0226959 A1* | 8/2013 | Dittrich ............... | G06F 16/2453 707/769 |
| 2013/0232176 A1* | 9/2013 | Plattner ................ | G06F 16/213 707/803 |
| 2015/0088813 A1 | 3/2015 | Lahiri et al. | |

(56) References Cited

U.S. PATENT DOCUMENTS

2016/0147833 A1 5/2016 Chaudhry et al.
2018/0011893 A1 1/2018 Kimura

FOREIGN PATENT DOCUMENTS

EP 0 501 180 A 9/1992
WO WO 2015/094179 A1 6/2015

OTHER PUBLICATIONS

U.S. Appl. No. 14/097,575, filed Dec. 5, 2013, Office Action, dated Nov. 4, 2015.
U.S. Appl. No. 14/097,575, filed Dec. 5, 2013, Final Office Action, dated Jul. 14, 2016.
Loaiza, U.S. Appl. No. 15/693,273, filed Aug. 31, 2017, Office Action, dated Oct. 2, 2018.
Lahiri, U.S. Appl. No. 14/097,575, filed Dec. 5, 2013, Office Action, dated Apr. 6, 2017.
Lahiri, U.S. Appl. No. 14/097,575, filed Dec. 5, 2013, Office Action, dated Feb. 20, 2018.
Lahiri, U.S. Appl. No. 14/097,575, filed Dec. 5, 2013, Notice of Allowance, dated Nov. 9, 2018.
Oracle, "Oracle Times Ten In-Memory Database API and SQI Reference Guide", Release 6.0, dated 2006, 37 pages.
Aronovich et al., "The Design of a Similarity Based Deduplication System", SYSTOR, 2009, 14 pages.
Bober, Paul M., et al., "On Mixing Queries and Transactions via Multiversion Locking", Computer Sciences Department, University of Wisconsin, 1992, pp. 535-545.
Bornhovd et al., "Adaptive Database Caching with DBCache", IEEE 2004, pp. 11-18.
Elmasri, et al., "Fundatmentals of Database Systems," Third Edition, Addison-Wesley Longman, Inc., Copyright © 2000, ISBN—0-8053-1755-4, 26 pages.
Forman et al., "Efficient Detection of Large-Scale Redundancy in Enterprise File Systems", dated Jan. 2009, 8 pages.
Ailamaki, Anastassia, et al, "Weaving Relations for Cache Performance",Proceedings of the 27th International Conference on Very Large Data Bases dated Sep. 11-14, 2001, 14 pages.
Mohan, C., et al., "Efficient and Flexible Methods for Transient Versioning of Records to Avoid Locking by Read-Only Transactions",Almaden Research Center, date Feb. 6, 1992, pp. 124-133.
Vassilakis et al., "Implementation of Transaction and Concurrency ControlSupport in a Temporal DBMS", Department of Information Systems, University of Athens, vol. 23 No. 5. Pub 1998, 16 pages.
Oracle® Clusterware, Administration and Deployment Guide, 11g Release 1(11.1), B28255-06, Oct. 2008. http://download.oracle.com/docs/cd/B28359_01/rac.111/b28255.pdf.
Oracle®, "TimesTen to TimesTen In-Memory Database Introduction", Release 7.0, B31687-03, Sep. 2007. http://download.oracle.com/otn_hosted_doc/timesten/703/TimesTen-Documentation/intro.pdf.
Oracle®, "TimesTen to TimesTen Replication Guide", Release 7.0, B31684-03, Sep. 2007. http://download.oracle.com/otn_hosted_doc/timesten/703/TimesTen-Documentation/replication.pdf.
Teschke et al., "Concurrent Warehouse Maintenance Without Comprising Session Consistency", University of Erlangen-Nuremberg., Pub 1998, 10 pages.
The Times Ten Team, Mid-Tier Caching: The Times Ten Approach, Jun. 2002. ACM SIGMOD, 6 pages.
The TimesTen Team, "High Performance and Scalability through Application-Tier, In-Memory Management", Proceedings of 26th International Conference on Very Large Databases, 2000, pp. 677-680.
Harder Theo et al., "Database Caching—Towards a Cost Model for Populating Cache Groups," ADBIS 2004, LNCS 3255, A. Benczur, J. Demetrovics, 15 pages.

\* cited by examiner

COMBINED ROW AND COLUMNAR STORAGE FOR IN-MEMORY DATABASES FOR OLTP AND ANALYTICS WORKLOADS

RELATED APPLICATION

The present application is a continuation of U.S. patent application Ser. No. 14/097,575, entitled Combined Row And Columnar Storage For In Memory Databases For OLTP and Analytics Workloads, filed by Tirthankar Lahiri, et al. on Dec. 5, 2013, the entire contents of which is hereby incorporated by reference as if fully set forth herein, which claims the benefit of Provisional Appin. 61/880,884, entitled Combined Row and Columnar Storage for In-Memory Databases for OLTP and Analytics Workloads, filed by Tirthankar Lahiri, et al. on Sep. 21, 2013.

FIELD OF THE INVENTION

The present invention relates to database management systems (DBMS), and in particular, to columnar storage of a database within a DBMS.

BACKGROUND

DBMS's store database data in several storage formats. These include row-major format, column-major format, and hybrid-columnar format. In row-major format, column values of a single row are stored contiguously in an address space within an unit of memory, such as a data block. In column-major format, values of a column of multiple rows are stored contiguously within an address space within an unit of memory. In hybrid-columnar format, the entirety of a set of rows is contained within a persistent unit of memory, such as a data block. However, within the unit of memory, at least a subset of the set is stored in column-major format.

Row-major format offers greater performance for workloads involving random access patterns, such as index table look-ups and frequent updates of data involving finer grained access row-level updates. Row-major format is less optimal for columnar scanning, because the scanning involves reading in many columns of the row that are not the subject of the columnar scanning operation.

Column-major format is effective for columnar scanning because a single column can be read without reading in other columns not relevant to the columnar scanning operation. Various hardware acceleration techniques such as pre-fetching and vector-oriented execution may be used to accelerate a columnar scanning operation. In addition, column-major format permits better compressibility. The values within a column may have common properties such that, when the values are stored contiguously, the common properties can be exploited using various compression techniques.

On the other hand, column-major format has the disadvantage that updates are inefficient; updates to columns require significant re-organization of the columns. In general, in approaches where column-major data is updated, changes to a column are first temporarily staged and later merged into the column-major data, typically in an offline batch.

One approach to updating column-major data is row-copy-first updating. Under row-copy-first updating, two complete versions of a database are maintained, one in column-major format and one in row-major format. Updates are made to the row-major copy and later applied in batch to the column-major copy. These approaches entail storage overhead and latency between when changes are made and when the changes can be seen by queries computed against the column-major version.

Another approach is the change-inline approach, which is used for data stored in hybrid-columnar format. The hybrid-columnar format is designed to realize to a degree the benefits of both row-major and column-major format, while mitigating disadvantages of the column-major format, including disadvantages for updating. The impact of an update to a set of rows is limited to the data blocks that store the set.

However, an update to a column of a row in a data block entails converting the row into row-major format within the data block, updating the row and retaining the row in row-major format within the data block. Eventually, the converted row may be converted back into column-major format in the data block. This approach entails the overhead of converting rows into row-major format and of handling complications of computing queries against data blocks that store rows in the both column-major and row-major formats.

DETAILED DESCRIPTION

Figure 1:
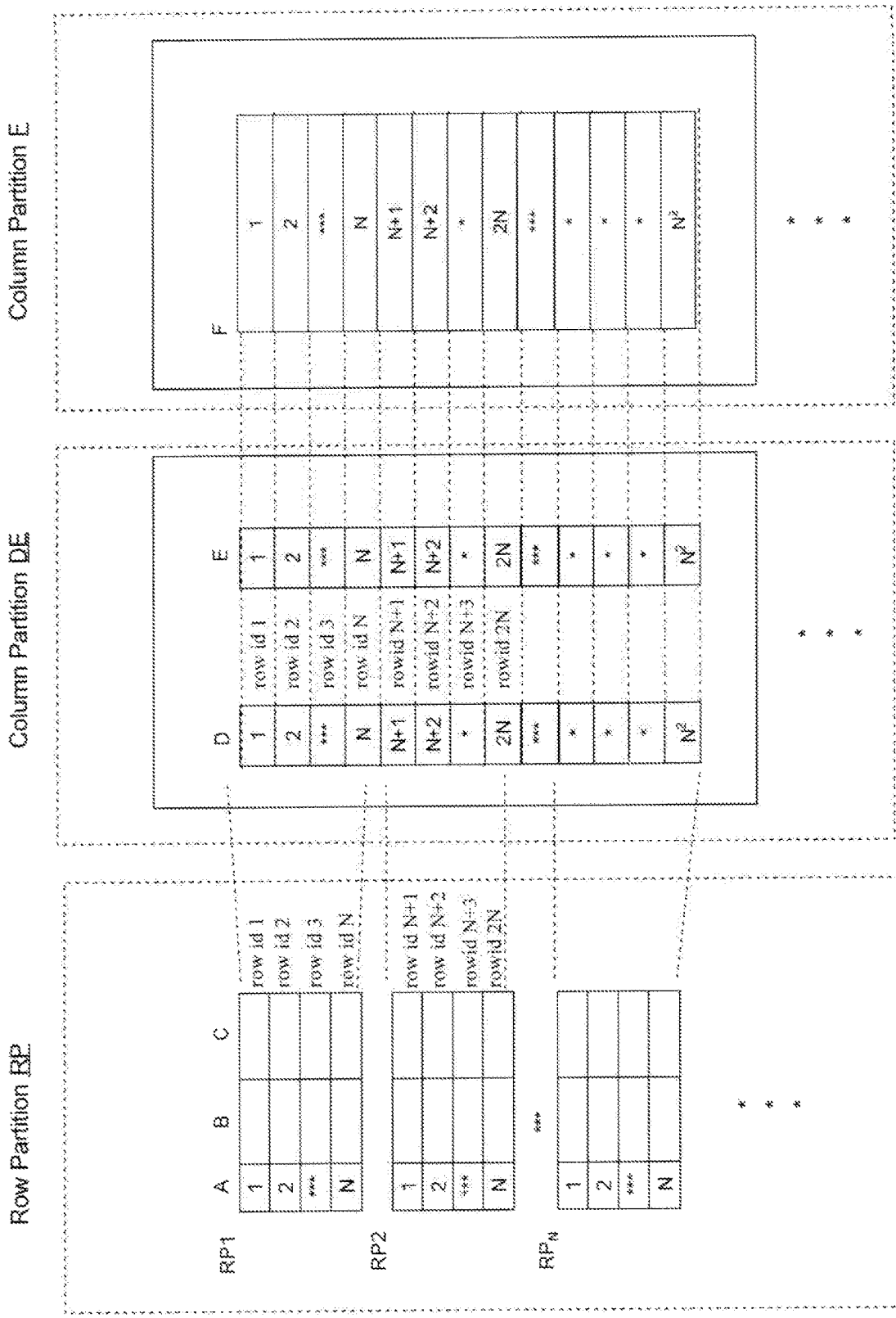
FIG. 1 is a diagram depicting column partitions and row partitions for storing dual-major data according to an embodiment of the present invention.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein are approaches for storing columns of a table in either row-major format or column-major format in an in-memory DBMS. For a given table, one set of columns is stored in column-major format; another set of columns for a table are stored in row-major format. This way of storing columns of a table is referred to herein as dual-major format. Managing, processing, and storing an in-memory dual-major database by an in-memory DBMS is referred to herein as Dual In-Memory Storage.

In addition, a row in a dual-major table is updated "in-place", that is, updates are made directly to column-major columns without creating an interim row-major form of the column-major columns of the row. The changes are immediately visible to database transactions of a DBMS after a database transaction commits the update, in accordance with standard transaction processing protocols.

Users may submit database definition language ("DDL") commands that declare the row-major columns and column-major columns of a table. Thus, a database may be designed to exploit the advantage of both row-major and column-major format for the same table. A storage format of a column may be selected and optimized in light of expected access patterns for the column.

In-Memory Dual-Major Database

According to an embodiment of the present invention, an in-memory DBMS manages, processes, and stores data in an in-memory dual-major database. In an in-memory DBMS, the DBMS manages a database that is primarily stored in random access memory (RAM). RAM in which the database is stored may comprise only volatile RAM, non-volatile RAM (e.g. PRAM), or a combination of both. Examples of an in-memory DBMS are described in (1) U.S. patent application Ser. No. 12/719,264, entitled Automated Integrated High Availability of the In-Memory Database Cache and the Backend Enterprise Database, filed by Sourav Ghosh, et al. on Mar. 8, 2010, the content of which is incorporated herein by reference, and in (2) U.S. patent application Ser. No. 12/030,094, Database System with Active Standby and Nodes, filed by Rohan Aranha on Feb. 12, 2008, the content of which is incorporated herein by reference.

Specifically, the columns of a table are stored in memory pages in the RAM of an in-memory DBMS. A memory page is an addressable unit of memory that is contiguous within an address space of the memory. The row-major columns of a table are stored in memory pages referred to herein as row pages. According to an embodiment of the present invention, row-major columns of a table are stored in a set of row pages referred to as a row page partition.

The column-major columns of a table are stored in memory pages referred to herein as column pages. Each column page stores one or more columns of a column group in column-major format. For a column group of a table, the column group is stored in a set of column pages referred to as a column partition. A table may have multiple column groups, each column in the column group being stored in a set of column pages in a column partition.

FIG. 1 depicts row page partitions and column page partitions according to an embodiment of the present invention. Referring to FIG. 1, it depicts row page partition RP, which includes row-major page $RP_1$, row-major page $RP_2$, and row page $RP_N$, column partition DE, which includes column page $DE_1$, and column partition F, which includes column page $F_1$.

In a row page partition, each row-major page stores row-major columns of a row as a row-part tuple in row-major format. The row's row-part tuple is stored in a row slot of the row page. A row and respective row-part tuple and row slot is functionally mapped to a row id, as shall be described in further detail.

According to an embodiment of the present invention, a row page holds N tuples of a row in N row slots. Each row slot is associated with a row slot number, which corresponds to the row slot's ordinal position within a row page, and which is used to identify the row slot within a row page. Row page $RP_1$ is divided into slots 1, 2 through N, each slot holding a row-part tuple for row-major columns A, B, and C in row-major format. The slot number of a slot is denoted in FIG. 1 in column A. Likewise, row partition $RP_2$ and $RP_N$ are each divided into row slots 1, 2 through N, each row slot holding a row-part tuple for row-major columns A, B, C in row-major format.

The row pages of a row partition are sequentially ordered. The row page order of row pages in row partition RP is row page $RP_1$, row page $RP_2$, followed by row page $RP_N$, as specified by the subscript. According to an embodiment of the present invention, the ordinal number corresponding to the order of the row page within a row partition serves as a row page id that identifies the row page. The row page id of a row page $RP_1$ is 1, of row page $RP_2$ is 2, of row page $RP_N$ is N, and so forth.

A row id of a row is a functionally mapped to the row's location in a row partition. According to an embodiment of the present invention, the row id is derived using a mathematical formula based on the row page id of the row page and row slot number of the row slot that holds the row-part tuple of a row, as follows.

(Row Page Id−1)*$N$+row slot number

Accordingly, the row ids of the rows contained in row page $RP_1$ for slot 1, 2, and N are 1, 2, and N, respectively. The row ids of the rows contained in row page $RP_2$ for row slots 1, 2, and N are N+1, N+2, and 2N, respectively.

Column Pages and Partitions

Column partition DE stores columns of a column group comprising columns D and column E. Column partition DE comprises column page $DE_1$, and other columns pages not depicted in FIG. 1. Column pages in a column partition are sequentially ordered similar to row pages, the ordering being denoted in the subscript of the label.

Columns stored in a column page are in column-major format in a column run comprising column slots. For each column in a column group of a column partition, each column page of the column partition holds a column run. Column page $DE_1$ includes a column run D and a column run E, which store column values for columns D and E, respectively.

Each column run has the same number of column slots. Each column slot is associated with a column slot number, which corresponds to the column slot's ordinal position within a column run, and which is used to identify the column slot within a column run. The column run D includes column slots 1, 2 through $N^2$; column run E in column page $DE_1$ also includes slots 1, 2 through $N^2$.

Column partition F includes column page $F_1$ and other column pages not depicted in FIG. 1. Column run F in column page $F_1$ includes column slots 1, 2 through $N^2$.

For a given row of a table, column values stored in column partitions for the row are stored in column pages that have the same column page id and in a column slot having the same column slot number. Thus, in column run D and column run E in column page $DE_1$, and column F in column page $F_1$, the column slot with column number 1 holds a column value for the same row.

According to an embodiment of the present invention, column pages have larger memory sizes, and contain a greater number of slots than the respective row pages. For a given column group, a column page stores the column values for the rows of corresponding multiple row pages. The number of slots in a column page is a multiple of the N slots in the row page. According to an embodiment of the present invention, that multiple is N, although present invention is not so limited. Thus, each column page of column partition DE and column partition F contains $N^2$ column slots.

The above arrangement between column pages, the column slots therein, the row pages and the row slots therein, facilitates the functional mapping of a row's row slot to the column slots holding column values for the row, through use of simple mathematical formulas that are based in effect on the location of the row in the row pages. For a given row stored in a row slot of a row page, within each column partition of a table, the column page id and column slot number of a column page holding a column value for the row is determined by the following formulas CLR.

CLR

Column Page Id=(Row page id−1)/$N$+1

Column Slot Number=((Row page id−1)*$N$+row slot number−1)% $N^2$+1

For example, for row $N$+2, the row page id is 2 and the row slot number therein is 2. According to the above formulas, the column page id in column partition DE that holds a column value for the row is (2−1)/$N$+1, which is 1. The column slot number is ((2−1)*$N$+2−1)% $N^2$+1, which equals $N$+2. Unless specified otherwise, the division denoted in the formulas presented herein is integer division, and % refers to integer modulus.

In the above arrangement and according to formulas CLR, a row page is associated with only one column page; a row slot is associated with only one column slot. However, a column page is associated with $N$ row pages, but a column slot is associated with only one row slot. The association is dictated by formulas CLR and other formulas described herein. The above one-to-one arrangement facilitates functional mapping of row slots and column slots through the use of simple mathematical formulas. In effect, the column slots and column pages that hold a row's column values is dictated by the row's storage location within a row page partition of the table of the row.

Location and Row ID Resolution

Location resolution refers to the operation of determining a location of a row in a row partition, row page, column partition, and/or column page. Columnar location resolution refers to determining the location of a row in a column partition and/or column page column given input about a row's location in a row page and/or row partition, such as row's row page id and row slot number, or row id. Columnar location resolution is performed based on formulas CLR. As illustrated above, the outcome of columnar location resolution is a column page id and column slot number.

Row location resolution refers to determining the location of a row in a row partition or row page given input from which the row's location is derived, such as the column page id and column slot number of the row, or row id. The outcome of row location resolution is a row page id and row slot number. The functional one-to-one mapping between the row slots and column slots may be exploited by using the formulas to quickly perform row location resolution. The following formulas RLRC yield a row location based on column page id and column slot number of a row.

RLRC

Row Page Id=((Column Page Id−1)*$N^2$)+(Column Slot Number−1)/$N$+1

Row Slot Number=(Column Slot Number) % $N$

For example, to determine the corresponding row page for column slot number $N$+2 for which the column page id is 1, the row page is calculated ((1−1)*$N^2$)+($N$+2−1)/$N$+1, which is 2. To determine the corresponding row slot number, the row slot number is calculated as ($N$+2)% $N$, which is 2.

To determine the row location from a row id, the following formulas RLRR may be used.

RLRR

Row Page Id=(Row Id−1)/$N$+1

Row Slot Number=(Row Id−1)% $N$+1

Row location resolution and columnar location resolution using formulas CLR, RLRC, and RLRR as described thus far yield locations that are logical; a row page id and row slot number comprise a logical location of a row in a row page, and a column page and column slot number comprise a logical location of a row in a column page. To access the row in memory, a memory address is needed. Thus, location resolution also includes generating a memory address for a row in a row page or column page.

To enable access to memory addresses of logical locations, a page directory is maintained within an in-memory DBMS. The page directory maps the row page ids of tables to the memory addresses of the row pages, and column pages of column groups to memory addresses of the column pages. To retrieve a row-part tuple for a row using a row page id and row slot number, the page directory is accessed and examined to determine the memory address mapped to the row page id of the row page, and the row slot number is used as an offset to access the row tuple within the row page. To retrieve a column value for a row using a column page and column slot number, the page directory is accessed and examined to determine the memory address mapped to the column page id of the column page, and the column slot number is used as an offset to access the column value within the column page.

Additional Page Structures

Figure 2:
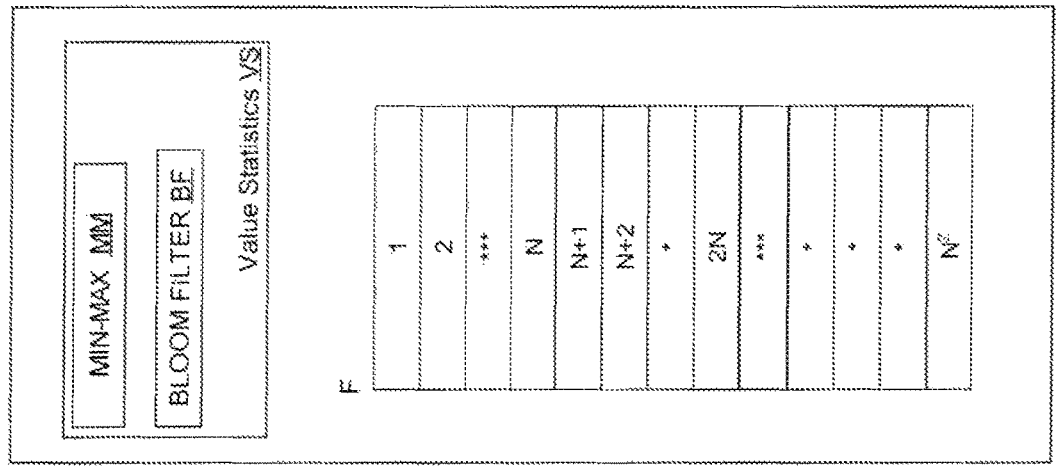
FIG. 2 is a diagram depicting a row page and column page according to an embodiment of the present invention.
Figure 2:
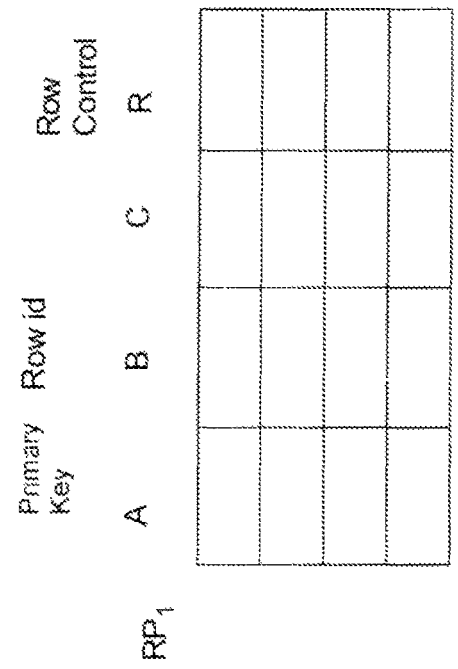

FIG. 2 shows a row page and column page with additional detail pertinent to various database operations described herein, such as columnar scanning and in-place updating operations discussed later.

Referring to FIG. 2, it depicts row page $RP_1$, with column A as a primary key column, and column B as a column storing row ids. According to an embodiment of the present invention, in column B, each row-part tuple in row partition RP stores the row ids of the respective row, allowing for a quick resolution of a row id of a row. According to an embodiment of the present invention, a table may include a primary key in the row-major columns of the table. In addition, the row-major columns of a table include at least one row control column. Row control column R includes information for managing the row, including information for concurrency and transaction control, such as reference counts, a transaction list, etc.

According to an embodiment of the present invention, each column page of a column partition includes value statistics on column values stored in the column page. Column page $CP_1$ includes Min-Max statistics MM and Bloom filter BM. Min-Max statistics specifies the minimum and maximum column value stored in a column page.

A Bloom filter is a probabilistic data structure that is used to identify values that are not a member of a set. A Bloom filter indicates existence of a large set of values by allowing for a certain degree of error. The nature of the Bloom filter is such that application of a Bloom filter against a value reveals one of two possibilities: (1) the value is not in the set for which the Bloom filter was derived; or (2) the value could be but is not necessarily in the set for which the Bloom filter was derived. That is to say, application of the Bloom filter may result in false positives, but never in false negatives. A Bloom filter in the value statistics of a column page is used to identify the existence or not of a column value in a column page. It is derived from the column values from the column page.

An in-memory DBMS may store, maintain, and use other structures for optimizing data access. For example, a row-major column and column-major column may be indexed by an index, such as a binary tree index or bitmap index. Such indexes may be created and maintained by the in-memory DBMS for a row-major or column-major column in response to receiving a DDL statement that declares the index for the column.

Columnar Scanning

The power of Dual In-Memory DBMS Storage is demonstrated by performance of the fundamental database operation of columnar scanning. In columnar scanning, a column is scanned to determine the rows that have column values that satisfy one or more filtering criteria. For purposes of illustration, the one or more filtering criteria comprise a filter criterion that a column value equal a predicate value specified in the predicate of a query being computed by the in-memory DBMS. The query is computed by the in-memory DBMS in response to receiving a database statement.

An output of columnar scanning of a column page includes information that identifies the rows having a column value that satisfies the one or more filtering criteria and/or that specifies the location of each of the rows. According to an embodiment of the present invention, the output includes a set of row pointers. A row pointer includes location information for locating the row-part tuple of a row. A row pointer may include a row id of the row, or the row page id and row slot number of the row. Using columnar location resolution and a row pointer for a row, or row page id and row slot number, the column values of the row can be located in the respective row page partitions and column partitions. In effect, a row pointer identifies the location of all the row's column values.

Figure 3:
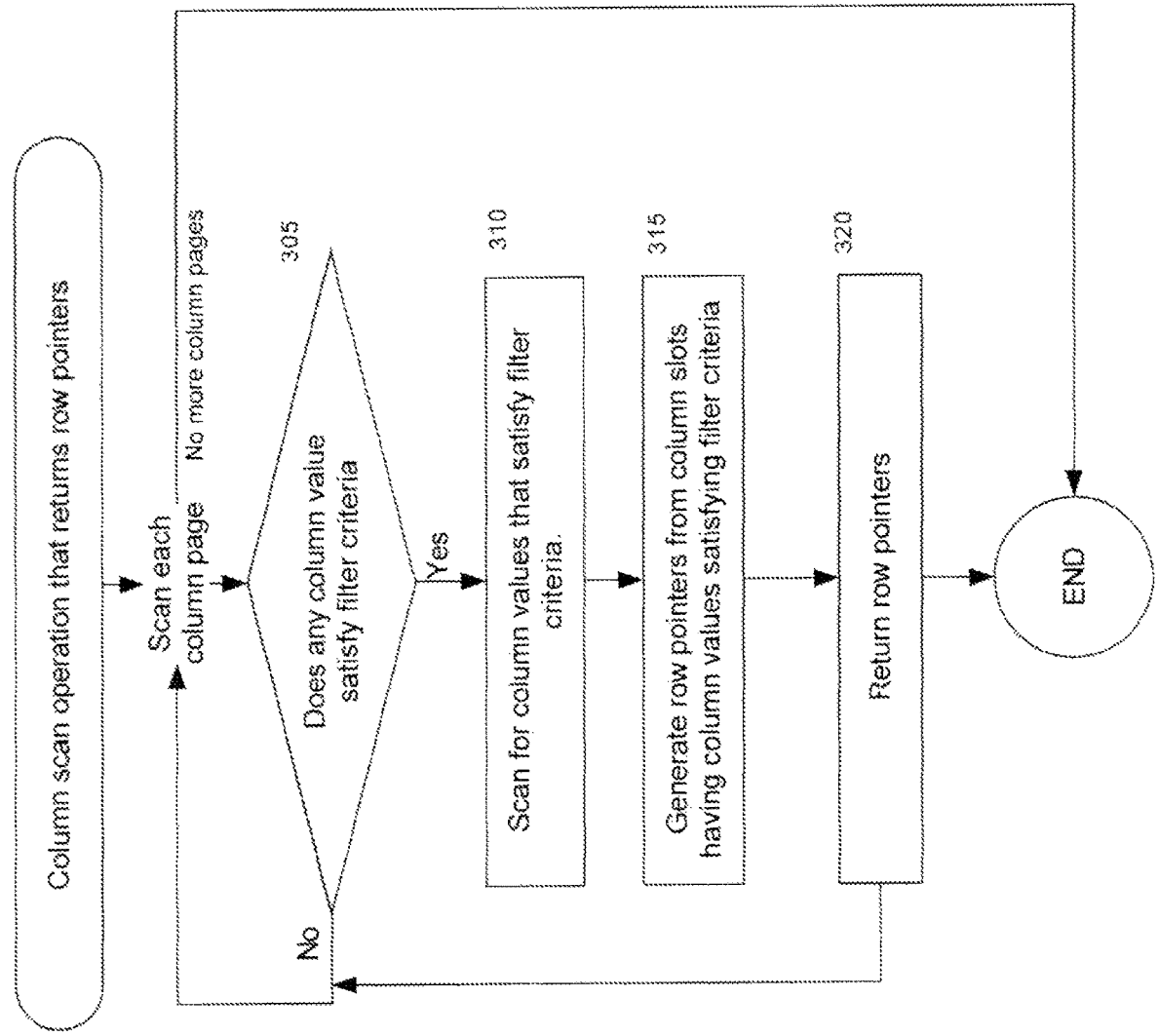
FIG. 3 is a flow chart depicting a procedure for columnar scanning on column pages according to an embodiment of the present invention.

FIG. 3 is a flow chart depicting a columnar scanning procedure for Dual In-Memory DBMS Storage. The columnar scanning procedure processes each column page of a column page partition.

Referring to FIG. 3, for each column page, at 305, it is determined from the value statistics in the column page whether any column values stored in the column page could satisfy the filtering criteria. If not, further columnar scanning processing of the column page is avoided, and no row pointers are returned for the column page. Another column page is then processed by the procedure, if any.

At 310, the column values in the column page are scanned. The column slot numbers of the column slots that have a column value that satisfy the filtering criteria are tracked.

At 315, row pointers are generated from the column slot numbers tracked in 310. The row pointers are generated using row location resolution based on the column page id of the column page and the column slot numbers tracked.

At 320, the row pointers generated are returned. Then another column page of the column partition is processed by the procedure.

In Place Updating

As mentioned previously, under Dual In-Memory Columnar Storage, a row may be updated in place in the memory that stores column-major data. To disambiguate in-place updating under Dual In-Memory Columnar Storage from various other approaches for updating column-major data, the various other approaches are described herein in further detail.

As mentioned earlier, in the row-copy-first approach, a DBMS maintains two versions of its database, a column-major version of the database and a row-major version of the database. Updates are first made to the row-major version, are committed or otherwise completed, and are then applied to the column-major version, often in batches.

Specifically, database transactions that are executed in the DBMS update the row-major version. The database transactions eventually are committed, thereby committing the updates made by the database transactions in the row-major version. After these transactions are committed, the updates are applied and or otherwise propagated to the column-major version.

In the change-inline approach, when a transaction updates a row stored in a data block in column-major format, the columns for the row are stitched together to store a row-major version of the row in the data block, which is updated accordingly. When the transaction is committed, the data block is committed with the row stored in row-major form. Subsequently, the data block may be reformatted to remove the row-major form of the row and to restore the row to column-major form in the data block.

In in-place updating under Dual In-Memory Columnar Storage, when a database transaction updates the row of a table stored in a row page and the column partition of the table, the changes are made in the row partition in row-major form and column partitions in column-major form. When the database transaction is committed, the changes in the row partition and column partitions are committed. No row-major form of the column-major columns of the row is generated and committed for the database transaction by a database server of the in-memory DBMS.

Figure 4:
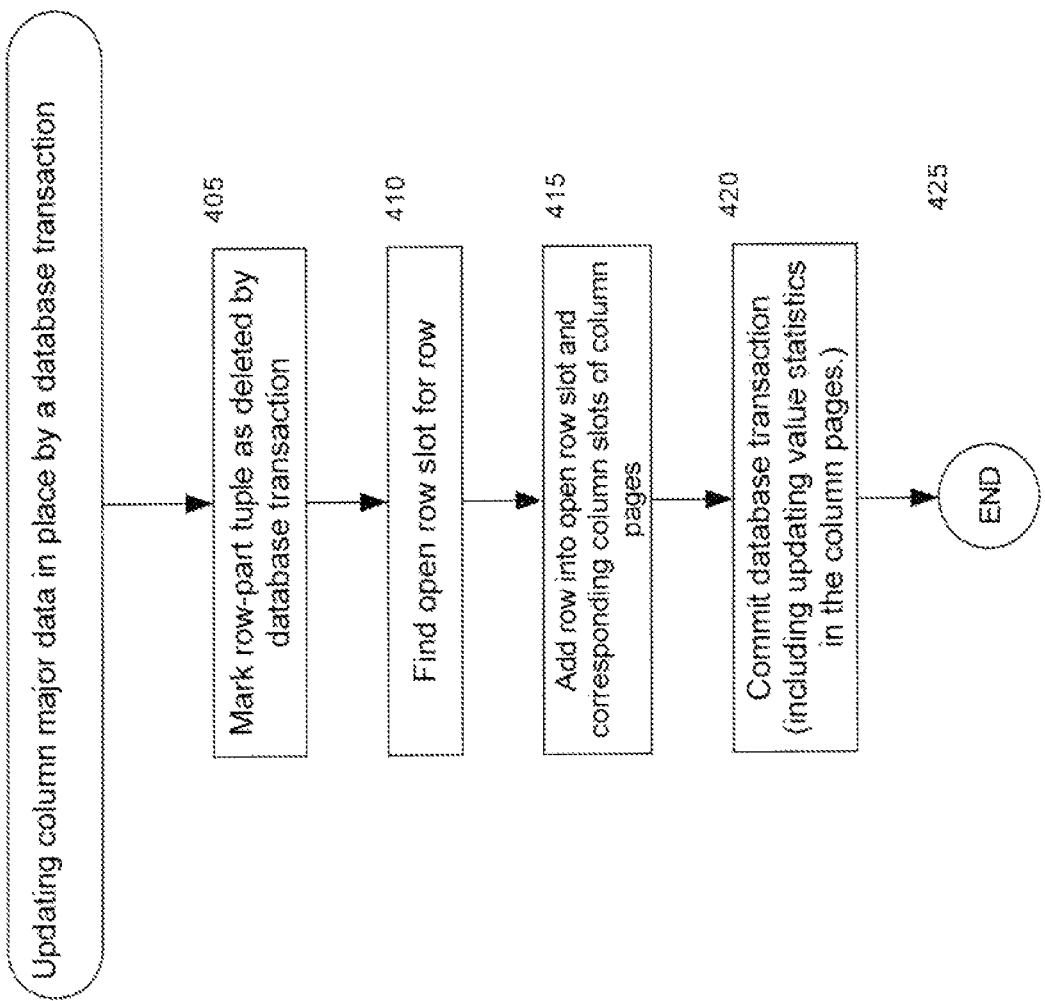
FIG. 4 is a flowchart depicting in-place updating according to an embodiment of the present invention.

FIG. 4 is a flow chart depicting a procedure for in-place updating performed by a database server of a DBMS to execute a database transaction, herein referred to as the "current database transaction". The database transaction is executed by the in-memory DBMS in response to the database server receiving a database statement requesting the update. For purposes of illustration, a column D of a "current row" is being updated with a new value by the database transaction.

Referring to FIG. 4, at 405, the row-part tuple of the row is marked as deleted. Specifically, the row control column of a row-part tuple is marked to indicate that the row is deleted by the current database transaction. The column values of the row are left unchanged by the database transaction in the row-part tuple and in the corresponding column slots of the row. Marking the column in this way enables other database transactions that scan the row before the current database transaction commits to see the row in the state as it existed before it was updated, in accordance with protocols for transaction processing.

At 410, an open row slot not being used to store a row is found in a row page of the row partition for the table. Because the row slot is open, the corresponding column slots for the columnar groups are also open.

At 415, the row being updated is stored in the open row slot and corresponding column slots. The columns slots are identified and located using columnar location resolution based on the row page id and row slot number of the open row slot. In addition, the new value is stored in column D. The row control column in the open row slot is updated to reflect that the row was stored in the row slot to update the current row for the current database transaction.

At 420, the current database transaction is committed, thereby committing the row in the open row slot and corresponding column slots. Committing the database transaction may entail updating the value statistics of the respective column pages to reflect the column values now committed in the corresponding slots. The min/max statistics and Bloom filters in the column pages are updated to reflect the existence of the column values added to the column pages.

Run Length Encoding of Columns

A column in a column partition may be compressed using run length encoding. Run-length coding is a form of data compression in which sequences of the same data value are stored as a combination of a data value and count instead of the sequences. The count represents the number of occurrences of the data value represented by the combination, and is referred to herein as a run count; the data value is referred to herein as the run value; the combination is referred to herein as an encoded run. The occurrences of a data value that are represented by an encoded run is referred to herein as a run. Run-length encoding is particular valuable for bodies of data with larger sequences of occurrences of the same data value.

According to an embodiment of the present invention, a single column stored in a column partition may be compressed using run-length encoding. Each run is represented by a column run tuple, which in effect is an encoded run. Column run tuples are stored in column slots in the same relative order the runs occur in the column.

In run-length encoding of a column in a table with L rows stored in L row slots, the column may be represented by K column run tuples stored in K column slots, where K is different and much smaller than L. This arrangement alters the one-to-one mapping relationship between row slots and column slots upon which the previously described formulas used for location resolution are based. To facilitate performance of location resolution, a positional index is maintained for a run-length encoded column partition. A positional index may also be used to index a column partition that is not run-length encoded.

In addition to run-length encoding, a row partition or column partition may be compressed using other techniques, such as dictionary compression or delta-encoding. In an embodiment of the present invention, a column partition may be compressed using dictionary compression and run-length encoding, thereby encoding runs of dictionary tokens. Dictionary compression of columns is described in U.S. patent application Ser. No. 13/224,327, entitled Column Domain Dictionary Compression, filed by Tirthankar Lahiri, et al. on Sep. 9, 2011, the contents of which are incorporated herein by reference.

Positional Index

According to an embodiment of the present invention, a positional index is used to identify column values based on row location information, such as a row id, or other location information, such as row page id and row slot number. The positional index is bi-directional, and can be used to determine a range of row ids, row page id and row slot numbers of rows that correspond to a column value, and to determine a column page id and column slot number of column slots of rows that correspond to the column value.

Figure 5:
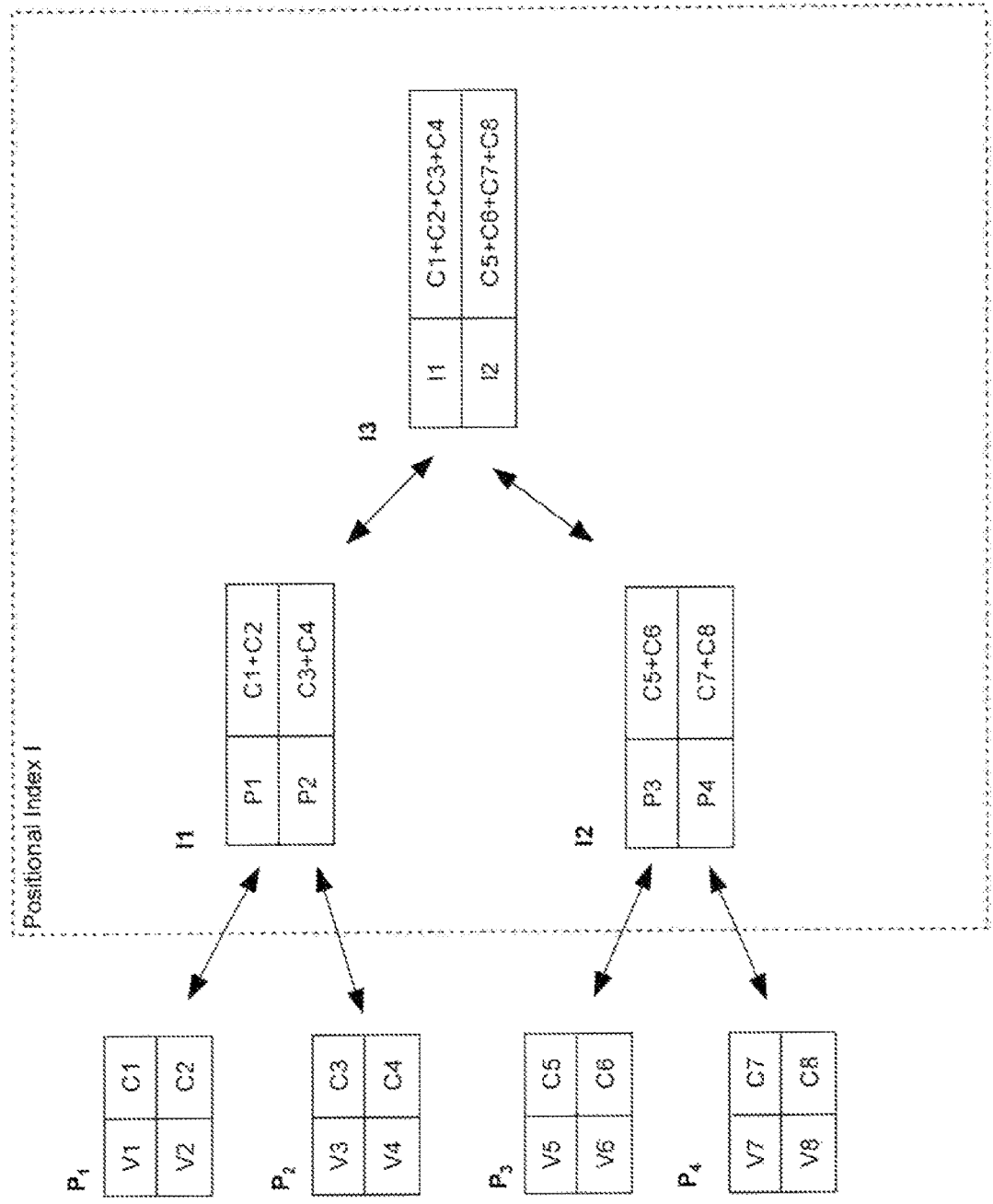
FIG. 5 is a diagram depicting a positional index on a column partition that is compressed using run-length encoding according to an embodiment of the present invention.

FIG. 5 depicts a positional index I according to an embodiment of the present invention, which indexes column partition P. Column partition P is compressed using run-length encoding. For purposes of exposition, each column page of column partition P contains two "column run tuples", each encoding and representing a run of column values. In order, column partition P includes column page $P_1$, column page $P_2$, column page $P_3$, and column page $P_4$. Column partition $P_1$ contains column run tuple (V1, C1), where V1 is the run value and C1 is the run count. Other column run tuples in the column partition P are identically structured. The next tuple in column page $P_1$ is (V2, C2). Following column page $P_1$ is column page $P_2$, with column run tuple (V3, C3) followed by (V4, C4), and so forth.

Positional index I is a hierarchical index comprising nodes I1, I2, and I3. Nodes in positional index I are organized in a parent-child hierarchy with other nodes in positional index I and with column pages in column partition P. For purposes of exposition, each node contains two "index tuples", each of which is a parent of other index nodes, or in the case of index tuples in leaf index nodes, a parent of a column page in the indexed column partition P.

Each index tuple contains (a) a link to a child, which is either an index node or column page of the indexed column partition, and (b) an aggregate run count, which is the sum of the run counts of runs which in effect is represented by a child of the index tuple. A sequence of runs is referred to as an aggregate run; the sum of the run counts of the aggregate run is referred to as the aggregate run count. Thus, each index tuple represents an aggregate run and contains an aggregate run count.

For the aggregate run represented by an index node, the index node includes a first aggregate run, a subsequent second aggregate run, and so forth. The first tuple represents the first aggregate run and holds the aggregate run count thereof. The next tuple represents the second aggregate run and holds the aggregate run count thereof, and so forth. Note the runs and the respective locations in the column partition are represented by virtue of the order of index tuples in the index nodes and the parent-child hierarchical relationship between the index nodes, which reflects the order of the runs.

An implication of the arrangement of a positional index described above is that the root index node in effect represents all the runs in the indexed column partition. Referring to FIG. 5, index node I3 is the root node and includes two tuples. The first index tuple is linked to index node I1 and contains an aggregate run count that is the sum of C1, C2, C3, and C4. In effect, the first index tuple represents the first runs in column partition P (i.e. in column page $P_1$ and $P_2$) by virtue of its order in index node I3 and its aggregate count covering the aggregate count of the first runs. The second index tuple is linked to index node I2 and contains an aggregate run count that is the sum of C5, C6, C7, and C8. In effect, the second index tuple represents the second and remaining runs in column partition P (i.e. in column pages $P_3$ and $P_4$).

Index node I2 is a child of the first tuple in root index node I3 and represents that first tuple's aggregate run. Index node I2 itself contains index tuples. The first index tuple is linked to column partition $P_1$ and contains an aggregate run count that is the sum of C1 and C2. This first index tuple represents the first runs of column partition P (those of column pages $P_1$ and $P_2$) by virtue of its order in index node I1 and index node I1's position in the parent-child hierarchy of positional index I. The second index tuple represents the next runs of column partition P (those of column pages $P_3$ and $P_4$) by virtue of its order in index node I1 and index nodes I1's position in the parent-child hierarchy of positional index I.

Index node I2 is a child of the second index tuple in root index node I3 and represents that second tuple's aggregate run (those of column pages $P_3$ and $P_4$) in the same way as index node I1 represents the aggregate run of the first tuple in root index node I3.

Given a row id of a row, index nodes in positional index I are traversed to identify the column run tuple and column page id that holds the column value for the row. Importantly, within column partition P for a row having a row id R, the total run count of the encoded runs preceding the encoded run of the row plus the run count of the encoded run representing R must be at least great as the row id.

During the traversal, index nodes and index node tuples are visited. As index node tuples are visited, an accumulated run count is tracked. If the accumulated run count plus the aggregate run count of the index tuple being visited cover the row id, then the child index node tuple is visited. Otherwise, the aggregate run count of the index tuple is added to the accumulated run count and the next index tuple is visited. Eventually the column partition containing the run for the row id is visited and evaluated to retrieve the column value.

For example, assume a row id is C1+C2+C3+C4+2, and that C5 is greater than 2. In traversing positional index I, the first node visited is root index node I3. In examining the first tuple therein, it is determined that the aggregate run count C1+C2+C3+C4 is less than the row id. Therefore the aggregate run of the first tuple cannot include the row. Next, the second tuple is examined. Since accumulated run count C1+C2+C3+C4, and aggregate run count C5+C6+C7+C8 together is greater than the row-id, index node I2 must represent an aggregate run that covers the row id. The child index node I2 to which the second index tuple is linked is traversed to and visited.

Next, the first tuple in index node I2 is examined. Since the cumulative aggregate run count C1+C2+C3+C4 plus the aggregate run count C5+C6 of the first tuple is at least as great as the row, the first tuple in index node I3 must represent an aggregate run that covers the row id. The column page P3, to which the first index tuple is linked, is visited. Based on the difference between the cumulative aggregate run count and the row id, which is less than C5, it is determined the first column run tuple contains the value for the row id, which is value V5.

Reverse Traversal to Find Row ID

In an embodiment of the present invention, the child of an index node has a parent link to the index node. For a column page, a parent link to the parent index node may be stored in the column page or in the page directory. Positional index I can be traversed bottom up to find row ids and ranges of row ids of rows that contain a column value. Given a column value, a column run tuple with a matching value is found, and positional index I is traversed to find a corresponding row id or range of row ids. As each node is visited, the aggregate run counts of the preceding node index tuple of the parent index tuple are accumulated to determine the row id or range of row ids for the column value.

For example, for the value V7 in column page P4, the parent link of column page P4 is followed to visit node I2. It is determined that there is index tuple preceding the parent index tuple of column page P4; C5+C6, the aggregate run count of the preceding parent index tuple, is accumulated. Next, the parent link for index node I2 is followed to visit node I3. It is determined that there is an index tuple preceding parent index tuple; C1+C2+C3+C4 is added to the accumulated run count of C5+C6. The traversal of positional index I being complete, the range row ids is found to be the range of (accumulated run count+1) to (C7−1).

Once the corresponding row id or row ids are determined, row location resolution may be performed to find the rows in row page partition and column page partitions.

DBMS Overview

Embodiments of the present invention are used in the context of a DBMS. Therefore, a description of a DBMS is useful.

A DBMS manages a database. A DBMS may comprise one or more database servers. A database comprises database data and a database dictionary that are stored on a memory mechanism, such as a set of hard disks, or in the case of an in-memory DBMS, RAM.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing database commands is SQL. There are many different versions of SQL, some versions are standard and some proprietary, and there are a variety of extensions. DDL commands are issued to a database server to create or configure database objects, such as tables, views, or complex data types.

A disk-based DBMS uses disk storage to store databases. A disk-based DBMS is designed, programmed, configured, and optimized under the assumption that the data items and related data structures primarily reside on disk. Optimization algorithms, buffer pool management, and indexed retrieval techniques are designed based on this fundamental assumption.

One problem with disk storage is that access to the data items and to the data structures is relatively slow. Even when a disk-based DBMS has been configured to cache many data items and data structures in main memory, its performance is hobbled by assumptions of disk-based data residency. These assumptions cannot be easily reversed because they are hard-coded in processing logic, indexing schemes, and data access mechanisms.

An in-memory DBMS stores a database primarily in RAM. By managing a database in RAM and optimizing the data structures and data access algorithms for RAM, an in-memory DBMS is able to provide improved responsiveness and throughput compared even to a fully cached, disk-based DBMS. For example, an in-memory DBMS is designed with the knowledge that the data items reside in RAM in memory pages, and is thus able to take more direct routes to the data items, reducing lengths of code paths, and simplifying algorithms and data structures.

When the assumption of disk-residency is removed, complexity can be reduced. The number of machine instructions drops, buffer pool management may disappear, extra copies of the data items and/or data structures are not needed, and indexes shrink. Database statements may be computed faster. An in-memory DBMS may provide database persistency, by for example, archiving data from main memory to disk, or by maintaining a disk or flash-based transaction log.

A dual-memory DBMS may store a portion of a database as an in-memory database and another portion of the database as a disk-based database. Such a DBMS is configured to handle the complexities of both types of database storage. The in-memory database may be a copy or mirrored version of a portion of the disk-based database. Alternatively, an in-memory portion of the database may comprise database objects that are different than database objects in the disk-based database. Examples of a dual-memory DBMS are described in U.S. Provisional Patent Application No. 61/880,852 by Vineet Marwah, Jesse Kamp, Amit Ganesh, et al. (Oracle International Corporation as Applicant), entitled Mirroring, in Memory, Data From Disk To Improve Query Performance, filed on Sep. 21, 2013, the content of which is incorporated herein by reference.

A multi-node DBMS is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

A database is defined by a database dictionary. The database dictionary contains metadata that defines database objects physically or logically contained in the database. In effect, a database dictionary defines the totality of a database. Database objects include tables, columns, data types, users, user privileges, and storage structures used for storing database object data. The database dictionary is modified according to DDL commands issued to add, modify, or delete database objects.

For example, an in-memory DBMS receives a DDL statement that declares a table and certain columns of the table. The DDL statement may declare column groups, the columns that belong to each of the column groups, and that the column group is column-major. A row-major column may be declared row-major by default by not explicitly specifying so in the DDL statement, or by explicitly specifying so in the DDL statement. Alternatively, if the DDL does not specify whether a column is row-major or column-major, the columns may by default be column-major. In response to receiving the DDL statement, an in-memory DBMS modifies its database dictionary to add metadata defining the table, a column group, the column group as column-major, the columns that belong to the column group, and one or more row-major columns. Further in response to receiving the DDL statement, the in-memory DBMS creates column partitions for the column group, and one or row partitions for row-major columns.

A database dictionary is referred to by a DBMS to determine how to execute database commands submitted to a DBMS.

Changes to a database in a DBMS are made using transaction processing. A database transaction is a set of operations that change database data. In a DBMS, a database transaction is initiated in response to database statement requesting a change, such as a data manipulation language statement (DML) requesting as an update, insert of a row, or a delete of a row. Committing a transaction refers to making the changes for a transaction permanent.

Under transaction processing, all the changes for a transaction are made atomically. When a transaction is committed, either all changes are committed, or the transaction is rolled back.

Hardware Overview

According to one embodiment of the present invention, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
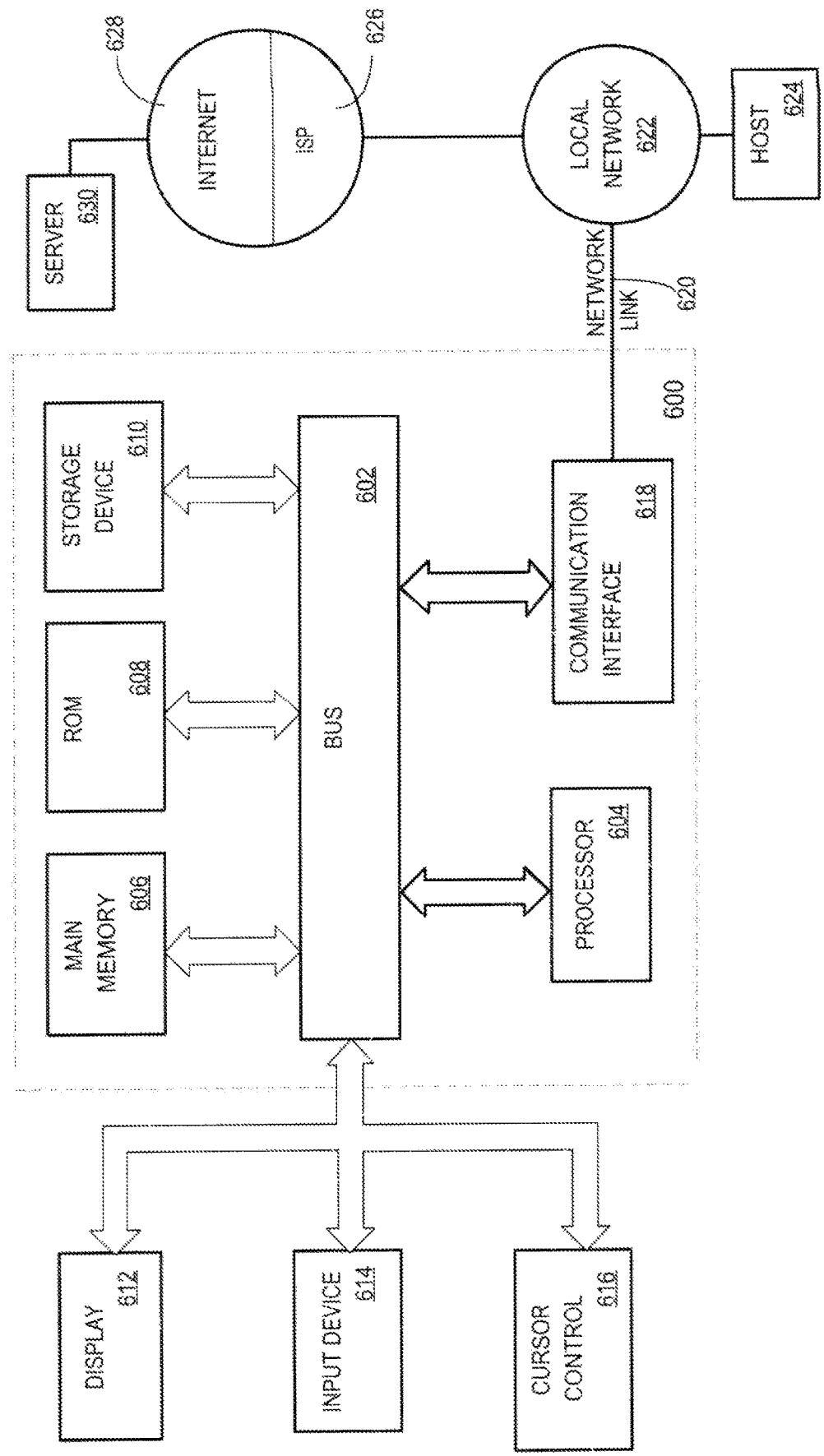
FIG. 6 is a diagram depicting a computer system that may be used in an embodiment of the present invention.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment of the present invention, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method, said method comprising steps of:
a database server receiving a data definition language (DDL) statement that declares a table in a database and table columns of said table;
wherein said database includes a database dictionary that defines database objects of said database;
wherein said DDL statement declares:
one or more column-major columns of said table columns, and
row-major columns of said table columns;
in response to receiving said DDL statement, creating said table by at least generating metadata in said database dictionary that defines:
said table,
said one or more column-major columns of said table, and
said row-major columns of said table;
storing rows in said table, wherein storing rows in said table comprises storing said one or more column-major columns of said rows in column-major format and storing said row-major columns of said rows in row-major format;
receiving a data manipulation language (DML) statement requesting to update a column value of a column-major column of said one or more column-major columns; and
in response to receiving said DML statement, updating in said database said column-major column in-place to a new value.

2. The method of claim 1,
wherein storing comprises:
storing said row-major columns in a row partition comprising row pages;
storing said one or more column-major columns in one or more column partitions, each column partition of said one or more column partitions comprising column pages;
wherein the method further comprises:
executing a database transaction, wherein executing said database transaction comprises said updating;

committing said database transaction; and
wherein said updating comprises storing said new value in a column page of said one or more column partitions before committing said database transaction.

3. The method of claim 1,
wherein storing comprises:
  storing said row-major columns in a row partition comprising row pages, each row page of said row pages comprising a plurality of row slots;
  storing said one or more column-major columns in one or more column partitions, each column partition of said one or more column partitions comprising column pages, each column page of said column pages comprising column slots;
wherein based on a functional mapping, a row slot in said row partition has a one-to-one association with a column slot in each column partition of said one or more column partitions.

4. The method of claim 3, the steps further comprising:
determining a location of a row in said row partition; and
based on said functional mapping and said location of said row in said row partition, for each column partition of said one or more column partitions, determining a location of a column value of said row in said each column partition.

5. The method of claim 3, the method further including:
determining a location of a row in a column partition of said one or more column partitions; and
based on said functional mapping and said location of said row in said column partition, determining a location of said row in said row partition.

6. The method of claim 3, wherein at least one column partition of said one or more column partitions is compressed using run-length encoding.

7. The method of claim 6, where the steps further comprise: based on a location of a row in said row partition, traversing an index that indexes said at least one column partition to determine a location of an encoded run in said at least one column partition corresponding to a column of said row.

8. The method of claim 7, the steps further comprising:
determining a location of a column value in said at least one column partition; and
based on said index and said location of said column, determining a location of a row holding said column value.

9. The method of claim 3, wherein for one or more column pages of said one or more column partitions, each column page of said one or more column pages is associated with a Bloom filter derived from column values in said each column page.

10. One or more non-transitory computer-readable media storing sequences of instructions, which, when executed by one or more processors, cause:
  a database server receiving a data definition language (DDL) statement that declares a table in a database and table columns of said table;
  wherein said database includes a database dictionary that defines database objects of said database;
  wherein said DDL statement declares:
    one or more column-major columns of said table columns, and
    row-major columns of said table columns;
  in response to receiving said DDL statement, creating said table by at least generating metadata in said database dictionary that defines:
    said table,
    said one or more column-major columns of said table, and
    said row-major columns of said table;
  storing rows in said table, wherein storing rows in said table comprises storing said one or more column-major columns of said rows in column-major format and storing said row-major columns of said rows in row-major format;
  receiving a DML statement requesting to update a column value of a column-major column of said one or more column-major columns; and
  in response to receiving said DML statement, updating in said database said column-major column in-place to a new value.

11. The one or more non-transitory computer-readable media of claim 10,
wherein storing comprises:
  storing said row-major columns in a row partition comprising row pages;
  storing said one or more column-major columns in one or more column partitions, each column partition of said one or more column partitions comprising column pages;
wherein the sequences of instructions include instructions, that when executed by said one or more processors, cause:
  executing a database transaction, wherein executing said database transaction comprises said updating;
  committing said database transaction; and
  wherein said updating comprises storing said new value in a column page of said one or more column partitions before committing said database transaction.

12. The one or more non-transitory computer-readable media of claim 10,
wherein storing comprises:
  storing said row-major columns in a row partition comprising row pages, each row page of said row pages comprising a plurality of row slots;
  storing said one or more column-major columns in one or more column partitions, each column partition of said one or more column partitions comprising column pages, each column page of said column pages comprising column slots;
wherein based on a functional mapping, a row slot in said row partition has a one-to-one association with a column slot in each column partition of said one or more column partitions.

13. The one or more non-transitory computer-readable media of claim 12, the sequences of instructions including instructions, that when executed by said one or more processors, cause:
  determining a location of a row in said row partition; and
  based on said functional mapping and said location of said row in said row partition, for each column partition of said one or more column partitions, determining a location of a column value of said row in said each column partition.

14. The one or more non-transitory computer-readable media of claim 12, the sequences of instructions including instructions, that when executed by said one or more processors, cause:
  determining a location of a row in a column partition of said one or more column partitions; and based on said functional mapping and said location of said row in said column partition, determining a location of said row in said row partition.

15. The one or more non-transitory computer-readable media of claim 12, wherein at least one column partition of said one or more column partitions is compressed using run-length encoding.

16. The one or more non-transitory computer-readable media of claim 15, the sequences of instructions including instructions, that when executed by said one or more processors, cause: based on a location of a row in said row partition, traversing an index that indexes said at least one column partition to determine a location of an encoded run in said at least one column partition corresponding to a column of said row.

17. The one or more non-transitory computer-readable media of claim 16, the sequences of instructions including instructions, that when executed by said one or more processors, cause:
  determining a location of a column value in said at least one column partition; and
  based on said index and said location of said column, determining a location of a row holding said column value.

18. The one or more non-transitory computer-readable media of claim 12, wherein for one or more column pages of said one or more column partitions, each column page of said one or more column pages is associated with a Bloom filter derived from column values in said each column page.

* * * * *